United States Patent
Takano et al.

(10) Patent No.: US 12,461,319 B2
(45) Date of Patent: Nov. 4, 2025

(54) ANGLED MULTIFIBER FERRULE AND OPTICAL FIBER CONNECTORS

(71) Applicant: SENKO Advanced Components, Inc., Hudson, MA (US)

(72) Inventors: Kazuyoshi Takano, Tokyo (JP); Kenji Iizumi, Tokyo (JP); Heng Loong Lee, Puchong (MY)

(73) Assignee: Senko Advanced Components, Inc., Hudson, MA (US)

( * ) Notice: Subject to any disclaimer, the term of this patent is extended or adjusted under 35 U.S.C. 154(b) by 451 days.

(21) Appl. No.: 17/822,207

(22) Filed: Aug. 25, 2022

(65) Prior Publication Data

US 2023/0067961 A1    Mar. 2, 2023

Related U.S. Application Data

(60) Provisional application No. 63/245,189, filed on Sep. 16, 2021, provisional application No. 63/239,672, filed on Sep. 1, 2021.

(51) Int. Cl.
   *G02B 6/38*    (2006.01)
(52) U.S. Cl.
   CPC ......... *G02B 6/3885* (2013.01); *G02B 6/3822* (2013.01); *G02B 6/3829* (2013.01); *G02B 6/3863* (2013.01)
(58) Field of Classification Search
   CPC .. G02B 6/3822; G02B 6/3829; G02B 6/3863; G02B 6/3885
   See application file for complete search history.

(56) References Cited

U.S. PATENT DOCUMENTS

| | | | | |
|---|---|---|---|---|
| 5,778,123 | A | * | 7/1998 | Hagan .................. G02B 6/424 385/76 |
| 9,366,830 | B2 | * | 6/2016 | Levin .................. G02B 6/3818 |
| 9,658,409 | B2 | | 5/2017 | Gniadek et al. |
| 9,880,361 | B2 | | 1/2018 | Childers et al. |
| 9,989,710 | B2 | * | 6/2018 | deJong ................ G02B 6/3861 |
| 10,185,100 | B2 | | 1/2019 | Takano et al. |
| 10,191,230 | B2 | | 1/2019 | Wong et al. |

(Continued)

OTHER PUBLICATIONS

SUMIX / Interferometers, "Measure Angles and Parallelism of Guide Holes along with the standard geometry parameters using Side + Front View technology", Dec. 2, 2020, 7 pages, found at https://www.sumix.com/interferometers/feature-tp-sfv.html (Year: 2020).*

*Primary Examiner* — Daniel Petkovsek

(57) ABSTRACT

A multifiber ferrule has a generally forward-facing angled ferrule contact surface that is skewed with respect to the widthwise axis of the ferrule such that the angled ferrule contact surface defines a widthwise skew angle with respect to the widthwise axis. A multifiber optical connector has a connector housing assembly that holds at least one of this type of ferrule. The connector housing assembly can hold two such ferrules so that the ferrule contact surfaces are angled in opposite widthwise directions and so that a broad side of the first ferrule opposes a broad side of the second ferrule in parallel, spaced apart relationship therewith. A polarity-changeable multifiber optical connector is also provided that includes a multifiber ferrule with a generally forward-facing ferrule contact surface at an oblique angle to the longitudinal axis.

9 Claims, 23 Drawing Sheets

(56) References Cited

U.S. PATENT DOCUMENTS

| | | | |
|---|---|---|---|
| 10,228,521 B2 | 3/2019 | Gniadek et al. | |
| 10,359,583 B2 | 7/2019 | Chang et al. | |
| 10,393,969 B2 | 8/2019 | Takano et al. | |
| 10,705,300 B2 | 7/2020 | Takano et al. | |
| 10,725,248 B2 | 7/2020 | Wong et al. | |
| 11,333,835 B2 * | 5/2022 | Jian | G02B 1/11 |
| 2013/0322825 A1 * | 12/2013 | Cooke | G02B 6/3885 |
| | | | 385/59 |
| 2015/0331201 A1 * | 11/2015 | Takano | G02B 6/3875 |
| | | | 385/71 |

* cited by examiner

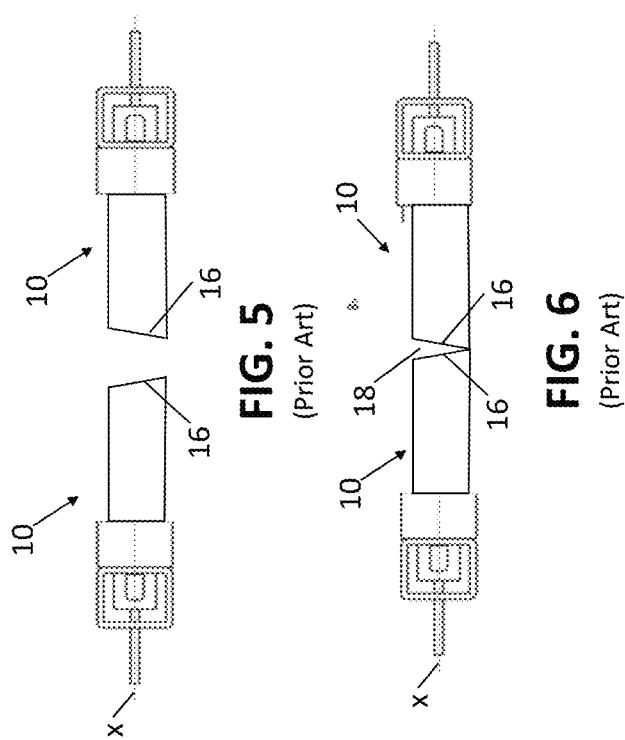

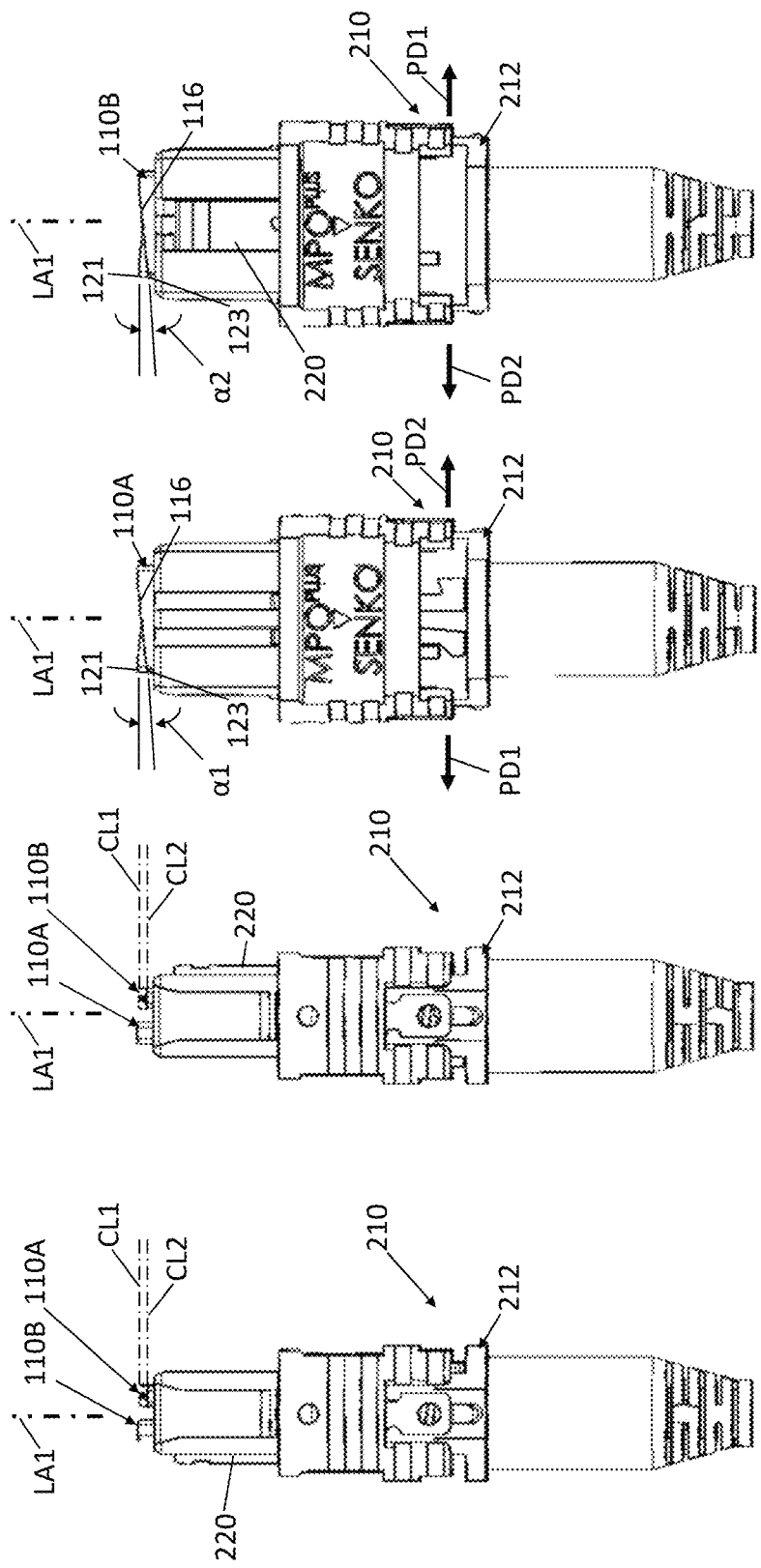

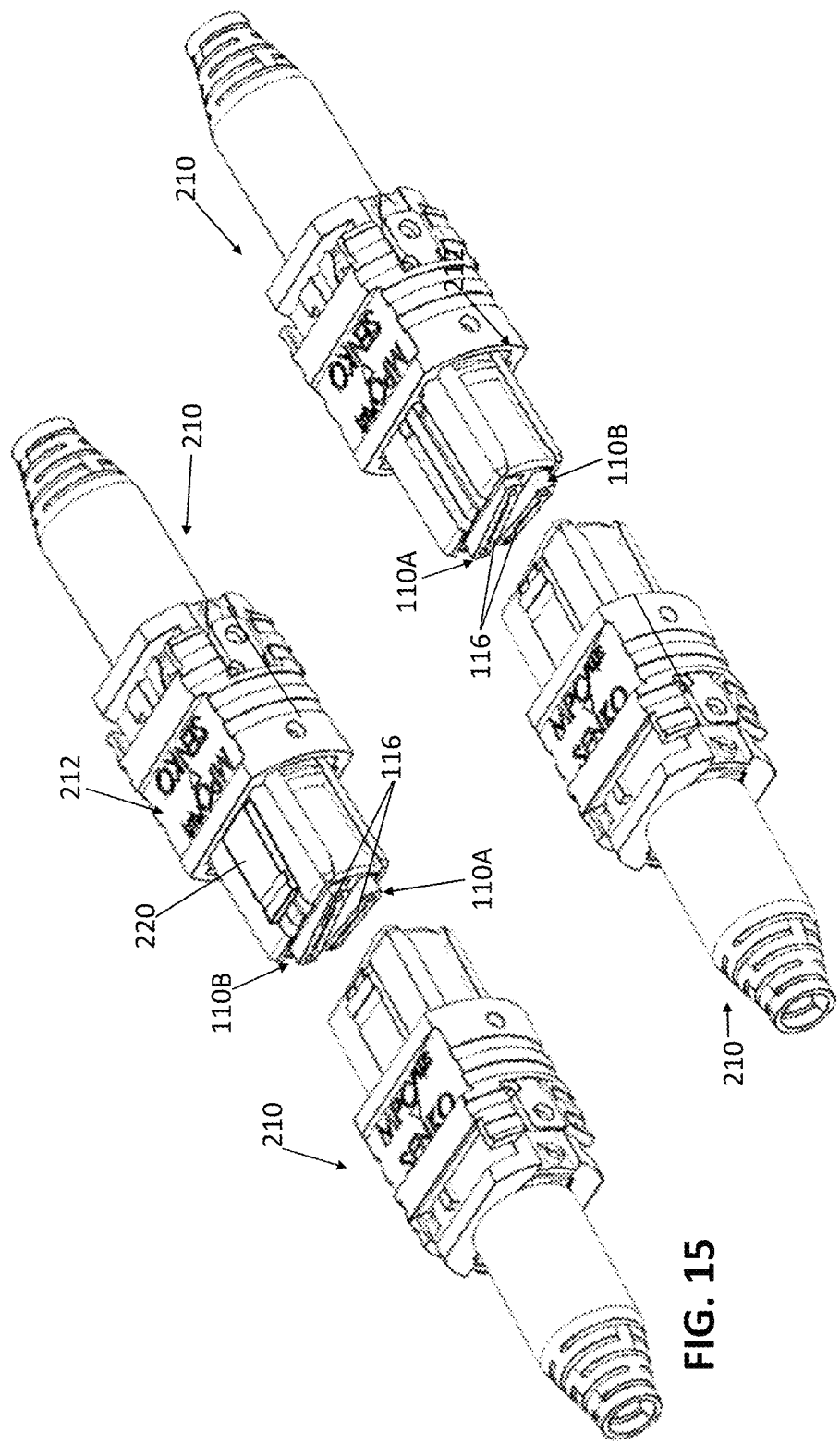

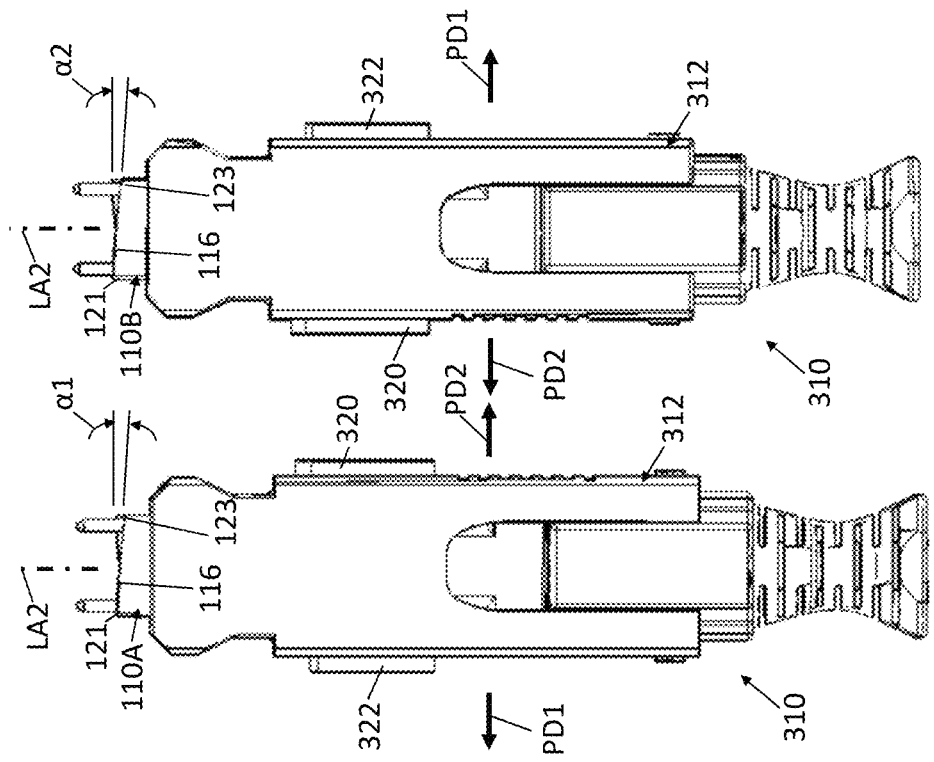
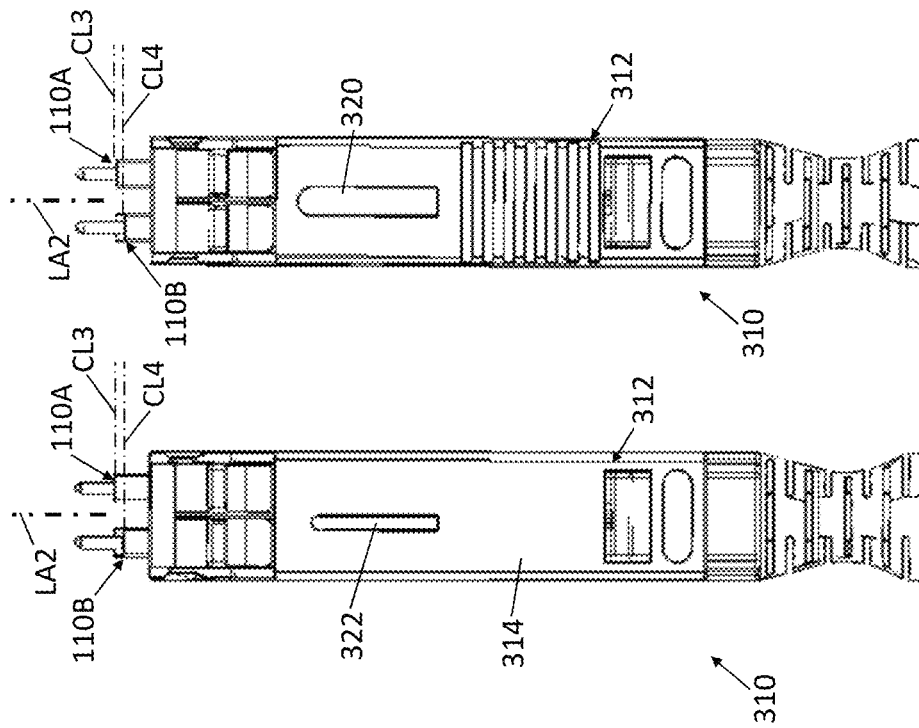

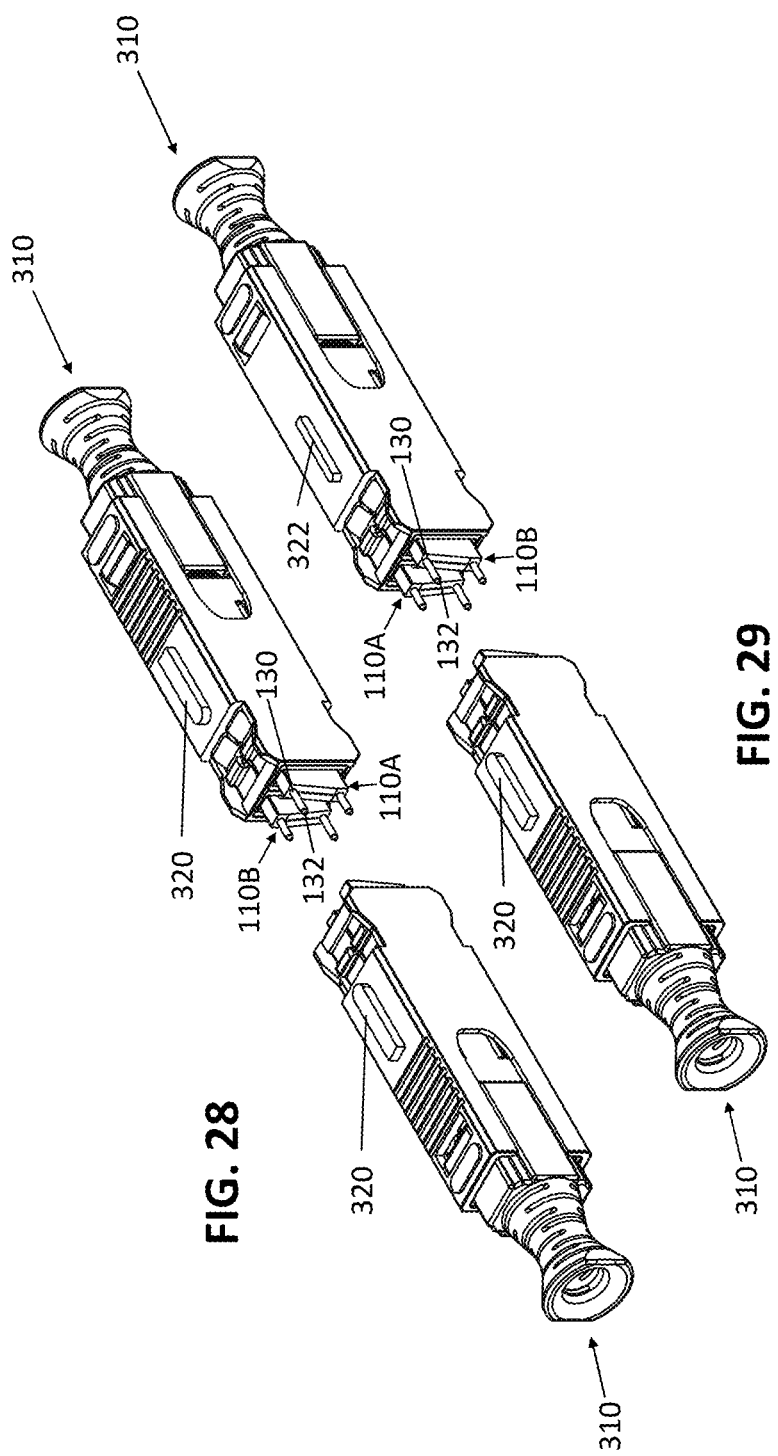

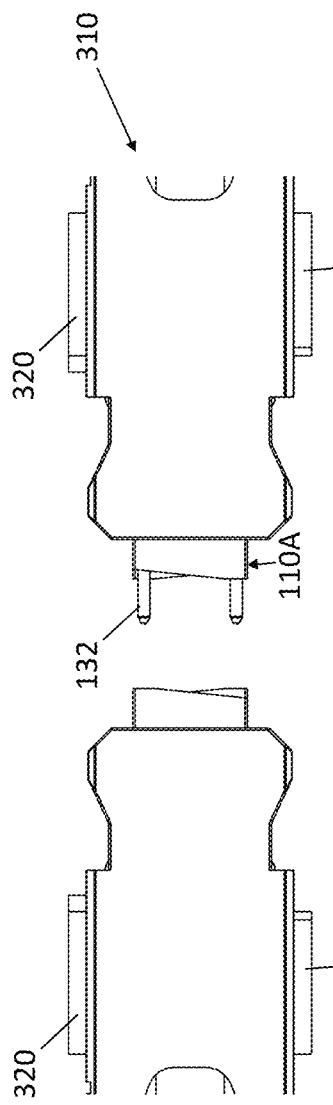
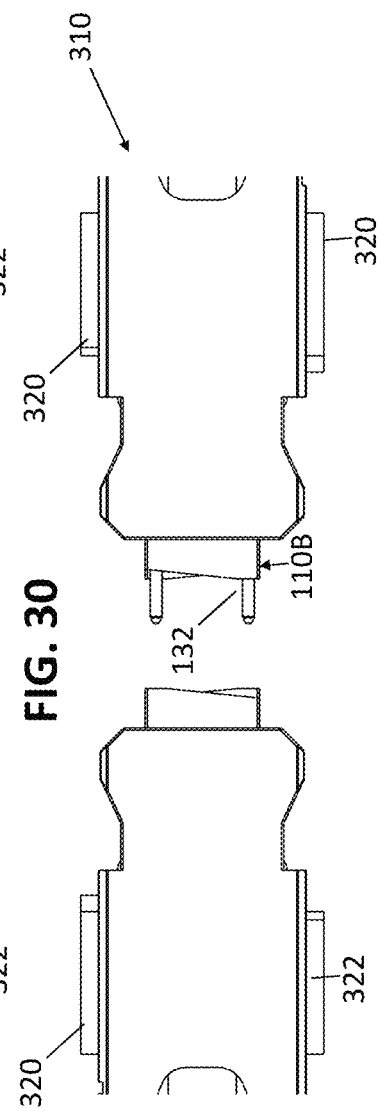

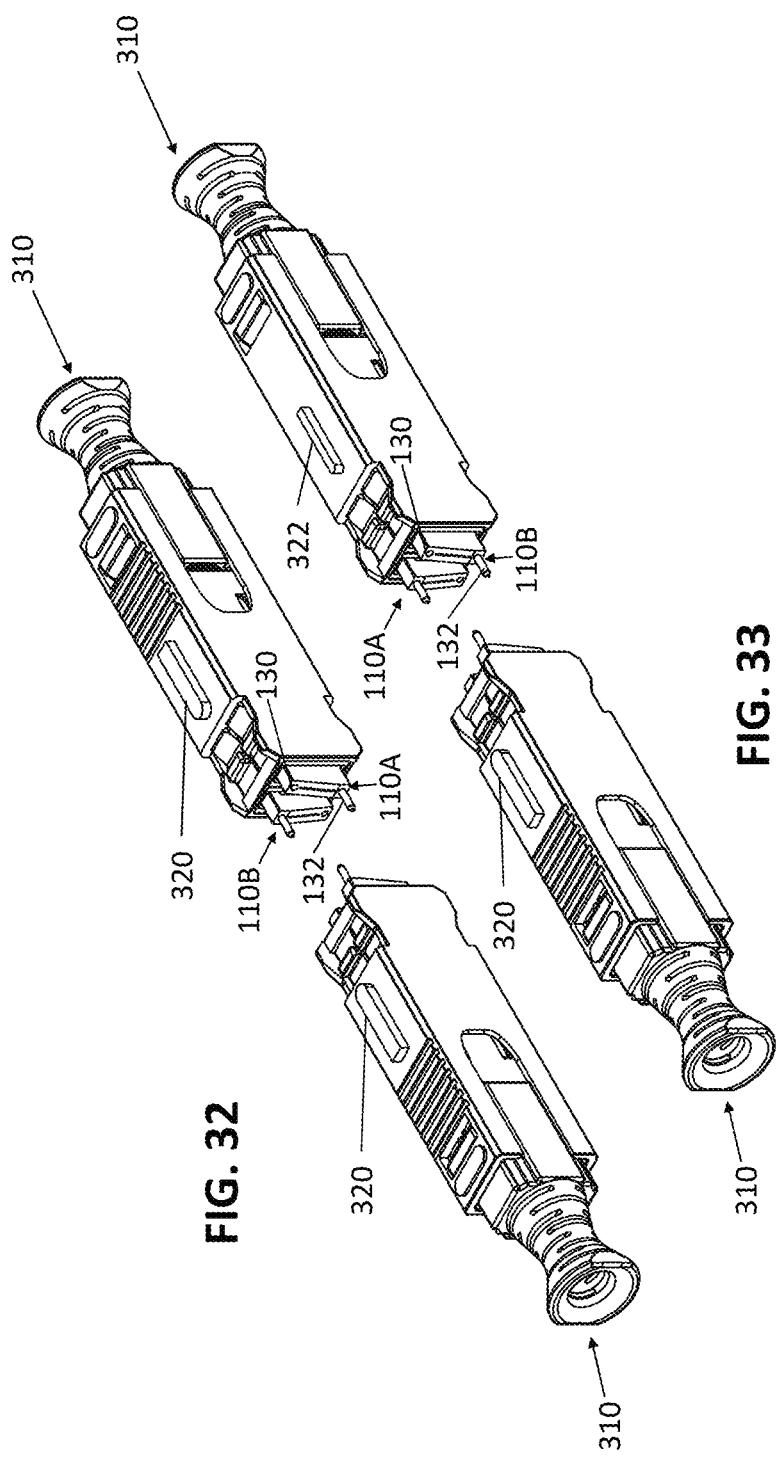

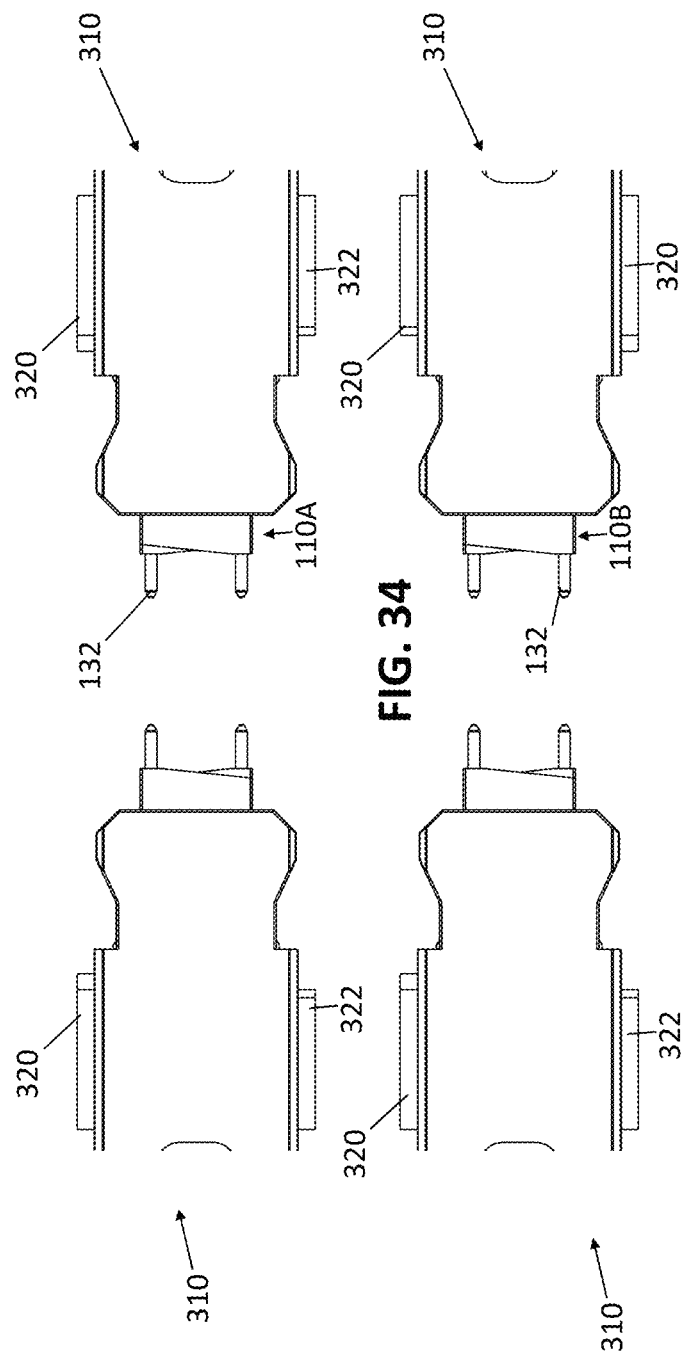

ANGLED MULTIFIBER FERRULE AND
OPTICAL FIBER CONNECTORS

CROSS-REFERENCE TO RELATED APPLICATION

This application claims priority to U.S. Provisional Patent Application No. 63/239,672, filed Sep. 1, 2021, and to U.S. Provisional Patent Application No. 63/245,189, filed Sep. 16, 2021, each of which is hereby incorporated by reference in its entirety.

FIELD

This disclosure generally pertains to an angled multifiber ferrule and optical fiber connectors comprising one or more angled multifiber ferrules.

BACKGROUND

The prevalence of the Internet has led to unprecedented growth in communication networks. Consumer demand for service and increased competition has driven network providers to continuously search for ways to improve quality of service while reducing cost. In certain applications, there is a need for plug-in connection systems with very low insertion loss. Various types of optical fiber connectors are used for this purpose (e.g., ST, SC, LC, MU, MPO, MT-RJ, CS, SN, MDC). Optical connectors generally comprise a connector housing assembly and a ferrule held in the connector housing assembly. The connector housing assembly terminates an optical fiber cable and the ferrule terminates one or more optical fibers. Different types of ferrules are used in different applications. The two most common categories of ferrules are single-fiber round ferrules (LC and ST ferrules) or multifiber rectangular ferrules (MT ferrules). When the optical fiber connector is plugged into a mating interface, a forward facing contact surface of the ferrule, through which the end of the fiber(s) is/are exposed, is pressed against a corresponding contact surface in the interface (e.g., the contact surface of another connector inserted on the opposite side of the interface). The geometry of the ferrule contact face must match the geometry of the opposing contact face in the interface to limit insertion losses.

Certain optical connectors are equipped with angled physical contact (APC) ferrules. APC ferrules are optical fiber ferrules having a forward facing ferrule contact surface that is ground and polished at an oblique angle with respect to the longitudinal axis. For some applications, APC ferrules are preferred to standard ferrules with polished end surfaces perpendicular to the longitudinal axis because APC ferrules minimize back-reflection. Angle-polished connectors should only be mated to other angle-polished connectors. Mating to a non-angle polished connector causes very high insertion loss. But when used properly, angle-polished connectors have lower insertion loss than good quality straight physical contact connectors.

SUMMARY

In one aspect, a multifiber ferrule configured for terminating a plurality of optical fibers comprises a ferrule body having a front end portion and a rear end portion spaced apart along a longitudinal axis, a first short side and an opposite second short side spaced apart along a widthwise axis perpendicular to the longitudinal axis, and a first broad side and a second broad side spaced apart along a transverse axis perpendicular to the longitudinal axis and the widthwise axis. The front end portion of the ferrule body defines a generally forward-facing angled ferrule contact surface. The ferrule body defines at least one row of at least four longitudinal fiber passages spaced apart along the widthwise axis. Each of the longitudinal fiber passages opens through the angled ferrule contact surface. The angled ferrule contact surface is skewed with respect to the widthwise axis such that the angled ferrule contact surface defines a widthwise skew angle with respect to the widthwise axis.

In another aspect, a multifiber optical connector comprises a connector housing assembly having a longitudinal axis, opposite first and second end wall portions, and opposite first and second side wall portions. At least one angled multifiber ferrule is received in the connector housing assembly. Each angled multifiber ferrule comprises a ferrule body having a front end portion and a rear end portion spaced apart along the longitudinal axis, a first short side and an opposite second short side spaced apart along a widthwise axis of the ferrule perpendicular to the longitudinal axis, and a first broad side and a second broad side spaced apart along a transverse axis of the ferrule perpendicular to the longitudinal axis and the widthwise axis. The front end portion of the ferrule body defines a generally forward-facing angled ferrule contact surface. The ferrule body defines at least one row of at least four longitudinal fiber passages spaced apart along the widthwise axis. Each of the longitudinal fiber passages opens through the angled ferrule contact surface. The angled ferrule contact surface is skewed with respect to the widthwise axis such that the angled ferrule contact surface defines a widthwise skew angle with respect to the widthwise axis.

In another aspect, a multifiber optical connector comprises a connector housing assembly having a longitudinal axis. At least one angled multifiber ferrule is received in the connector housing assembly. Each angled multifiber ferrule comprises a ferrule body having a front end portion and a rear end portion spaced apart along the longitudinal axis. The front end portion of the ferrule body defines a generally forward-facing angled ferrule contact surface. The ferrule body defines at least one row of at least four longitudinal fiber passages spaced apart along the widthwise axis. The angled ferrule contact surface is at an oblique angle relative to the longitudinal axis. The connector housing assembly is selectively reconfigurable with respect to the at least one angled multifiber ferrule between a first polarity configuration and a second polarity configuration. When the connector housing assembly is in the first polarity configuration: (i) the multifiber optical fiber connector is configured to mate with a mating interface in a first ferrule orientation relative to the mating interface in which the first broad side is above the second broad side or the first short side is above the second short side and (ii) the connector housing is configured to interfere with the multifiber optical connector mating with the mating interface in second ferrule orientation relative to the mating interface in which the second broad side is above first broad side or the second short side is above the first short side. And when the connector housing assembly is in the second polarity configuration: (i) the multifiber optical fiber connector is configured to mate with a mating interface in the second ferrule orientation and (ii) the connector housing is configured to interfere with the multifiber optical connector mating with the mating interface in first ferrule orientation.

Other aspects will be in part apparent and in part pointed out hereinafter.

BRIEF DESCRIPTION OF THE DRAWINGS

FIG. 5 is a schematic side elevation similar to FIG. 3 but showing the prior art ferrules in an improper orientation;

FIG. 6 is a schematic side elevation similar to FIG. 4 but showing the prior art ferrules in the improper orientation;

FIG. 9 is a side elevation of one of the multifiber connectors of FIG. 8;

FIG. 10 is a side elevation of the multifiber connector of FIG. 9 from the opposite vantage of FIG. 9;

FIG. 11 is a plan view of the multifiber connector of FIG. 9;

FIG. 12 is a plan view of the multifiber connector of FIG. 9 from the opposite vantage of FIG. 11;

FIG. 15 is another perspective of the multifiber connectors of FIG. 8;

FIG. 16 is another perspective similar to FIG. 15 but with one of the connectors in an inverted orientation;

FIG. 23 is a plan view of another embodiment of a multifiber connector according to this disclosure;

FIG. 24 is a plan view of the multifiber connector of FIG. 23 from the opposite vantage of FIG. 23;

FIG. 25 is an elevation of the multifiber connector of FIG. 23;

FIG. 26 is an elevation of the multifiber connector of FIG. 23 from the opposite vantage of FIG. 25;

FIG. 28 is a perspective of two of the multifiber connectors of FIG. 23 in a male-female configuration;

FIG. 29 is another perspective similar to FIG. 28 but with one of the connectors in an inverted orientation;

FIG. 30 is an elevation of the two of the multifiber connectors of FIG. 23 in a male-female configuration;

FIG. 31 is another elevation similar to FIG. 30 but with one of the connectors in an inverted orientation;

FIG. 32 is a perspective of two of the multifiber connectors of FIG. 23 in a hermaphroditic configuration;

FIG. 33 is another perspective similar to FIG. 32 but with one of the connectors in an inverted orientation;

FIG. 34 is an elevation of the two of the multifiber connectors of FIG. 23 in a hermaphroditic configuration;

FIG. 35 is another elevation similar to FIG. 34 but with one of the connectors in an inverted orientation;

Corresponding parts are given corresponding reference characters throughout the drawings.

DETAILED DESCRIPTION

Figure 2:
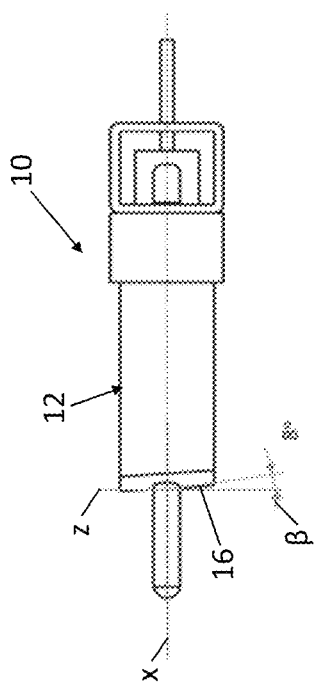
FIG. 2 is a side elevation of the prior art ferrule.
Figure 1:
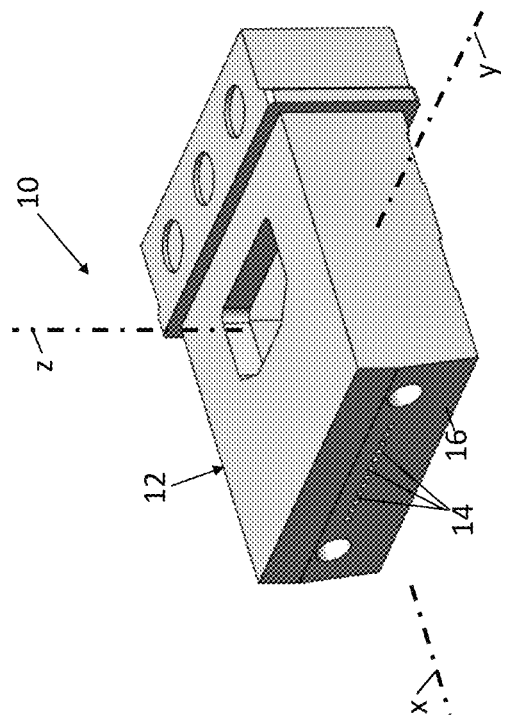
FIG. 1 is a perspective of an angled multifiber ferrule of the prior art.

This disclosure generally pertains to multifiber APC ferrules and connectors using same. Referring to FIGS. 1-6 a multifiber APC ferrule of the prior art is shown generally at reference number 10. The multifiber ferrule 10 comprises a ferrule body 12 having a front end portion and a rear end portion spaced apart along a longitudinal x axis, a first short side and an opposite second short side spaced apart along a widthwise y axis perpendicular to the longitudinal x axis, and a first broad side and a second broad side spaced apart along a transverse z axis perpendicular to the longitudinal x axis and the widthwise y axis. The ferrule 10 is configured for terminating a plurality of optical fibers. In the illustrated embodiment, the ferrule body 12 defines one row of twelve longitudinal fiber passages 14 spaced apart along the widthwise y axis. The front end portion of the ferrule body 12 defines a generally forward-facing angled ferrule contact surface 16. Each of the longitudinal fiber passages opens through the angled ferrule contact surface 16. In the prior art multifiber APC ferrule 10, the angled ferrule contact surface 16 is skewed with respect to the transverse z axis such that the angled ferrule contact surface defines a transverse skew angle β with respect to the transverse z axis. In the illustrated embodiment, the skew angle β is 8°. Stated another way, a plane including the angled ferrule contact surface 16 intersects the transverse z axis Referring to FIGS. 3-6, two multifiber APC ferrules 10 can be connected to one another by first orienting the ferrules so that the two ferrule contact surfaces 16 oppose one another and the ferrule bodies 12 are aligned along the y and z axes, and then bringing the ferrules together along the x axis. But as can be seen by comparing FIGS. 3 and 4 to FIGS. 5 and 6, good contact can only be made if the angled contact surfaces 16 are parallel. As shown in FIG. 6, if the angled contact surfaces 16 are not in the proper orientation, a gap 18 will separate the fiber end faces when the ferrules 10 are brought into contact. The gap 18 creates unacceptable insertion losses.

The inventors have recognized that the prior art multifiber APC ferrule 10 is not compatible with modern polarity changeable connector housing assemblies. Optical fiber connectors that terminate more than one optical fiber must be plugged into a mating interface in the correct orientation. If a multifiber optical connector is mistakenly inserted in an inverted orientation, the fibers will not be in the correct locations in the mating interface and therefore the correct optical connections will not be made. To prevent optical connectors from being inserted in an inverted orientation, the connector housing assemblies are made asymmetrically about the longitudinal axis, which creates a specific polarity. The polarity-specific features of the connector prevent it from accidentally being inserted in an inverted orientation. In recent years, the industry has invested significant research and development into making polarity-changeable connector housing assemblies that can change between a first polarity configuration and a second polarity configuration. Examples of polarity-changeable connector housing assemblies are described in U.S. Pat. Nos. 9,658,409, 10,393,969, 9,880,361, 10,705,300, and 10,191,230, each of which is hereby incorporated by reference in its entirety for all purposes.

Figure 3:
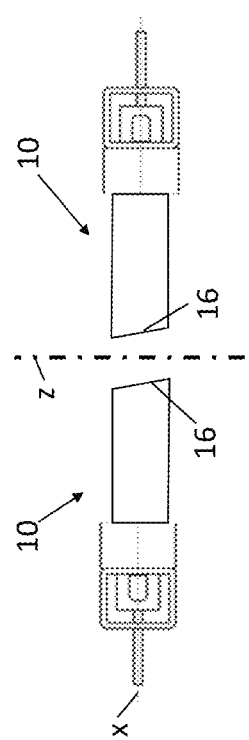
FIG. 3 is a schematic side elevation of two prior art ferrules approaching one another in a proper orientation.
Figure 4:
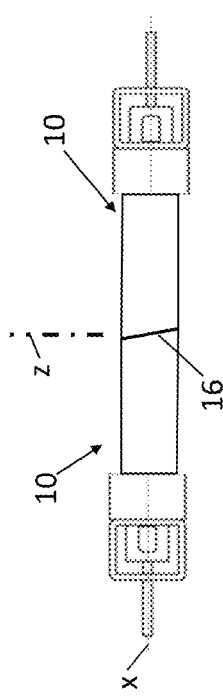
FIG. 4 is a schematic side elevation of the two prior art ferrules brought into end-to-end contact in the proper orientation.

In the industry, two widely used types of MT ferrule connectors have polarity changeable connector housings—the MTP Pro connector sold by US Conec and the MPO-Plus connector sold by Senko Advanced Components. But the polarity change features of these connectors are not usable with an APC ferrule 10. This can be understood by reference to FIGS. 3-6. In FIG. 3, the ferrule 10 on the left represents a ferrule supported in a polarity-changeable connector housing assembly (not shown) configured in a first polarity configuration and the ferrule 10 on the right represents a ferrule supported in a polarity-changeable connector housing assembly (not shown) configured in a second polarity configuration. In this arrangement the two connectors can be properly connected as shown in FIG. 4. But if the polarity of the right connector is changed to the first polarity configuration as shown in FIG. 5, a proper connection cannot be made. Hence, polarity change features are not useful in connectors employing the multifiber APC ferrules 10 of the prior art.

Figure 7:
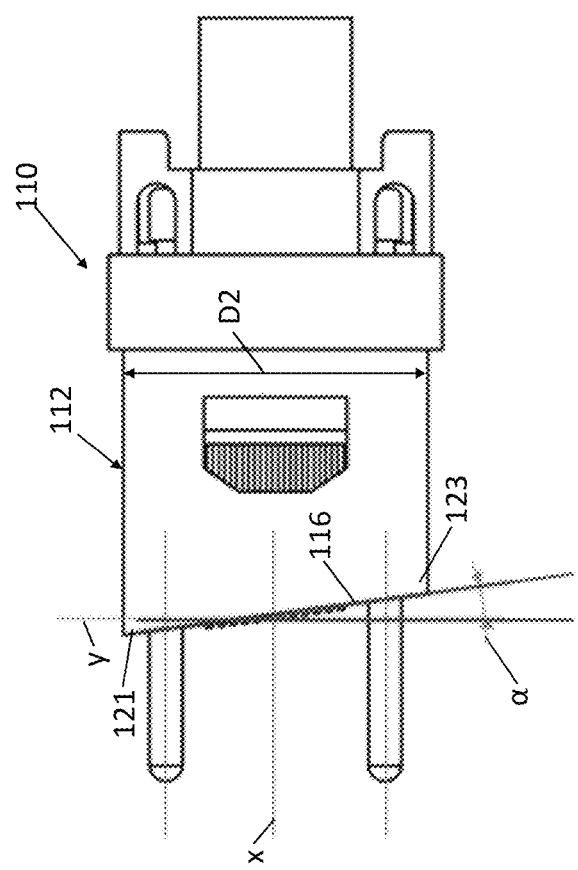
FIG. 7 is a top plan view of an angled multifiber ferrule according to the present disclosure.
Figure 8:
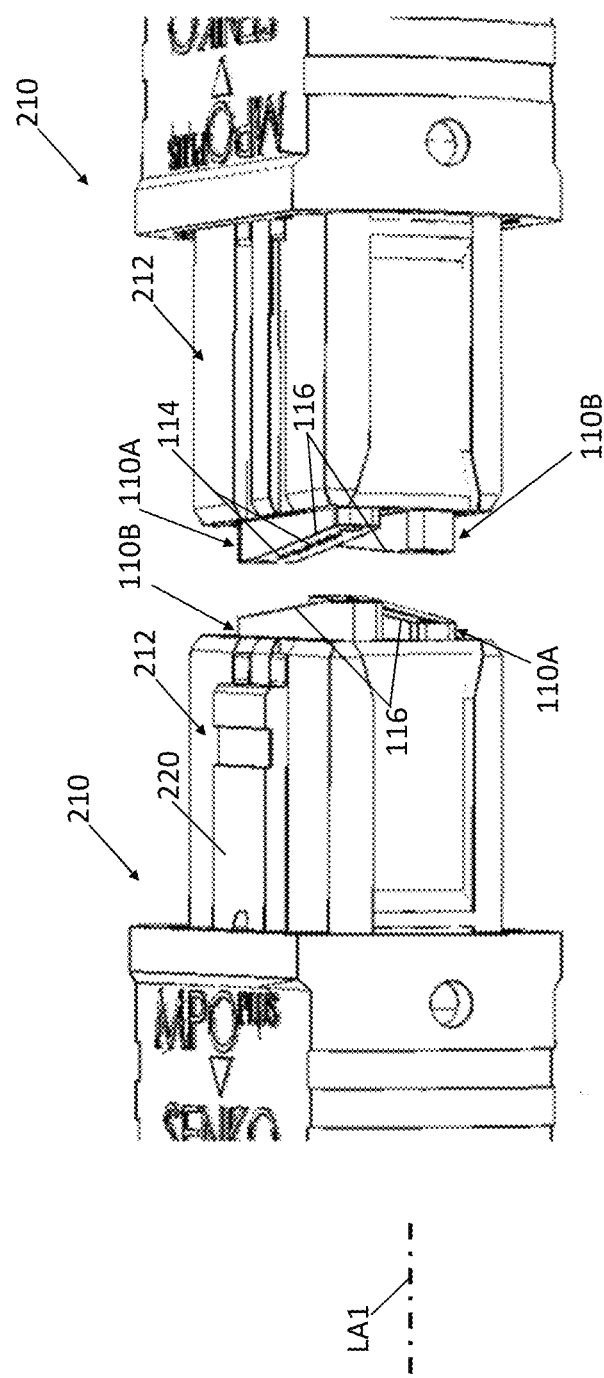
FIG. 8 is a perspective of two multifiber connectors according to the present disclosure.
Figure 20:
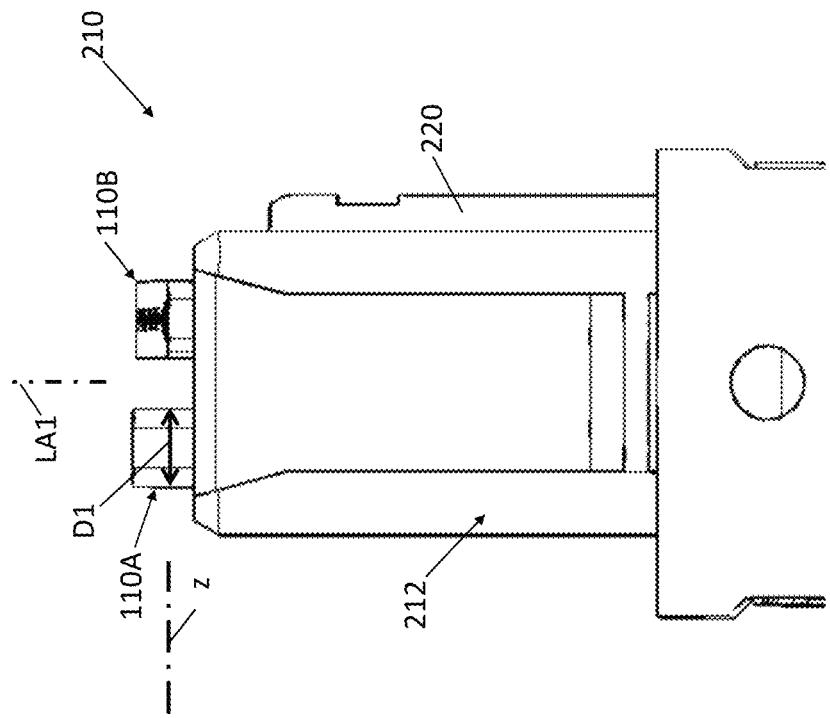
FIG. 20 is an enlarged view of a portion of FIG. 10.

Referring to FIG. 7, one embodiment of a multifiber ferrule according to the present disclosure is generally indicated at reference number 110. The ferrule 110 is the same as ferrule 10, except for the geometry of the angled ferrule contact surface 116. Thus, like the ferrule 10, the ferrule 110 comprises a ferrule body 112 having a front end portion and a rear end portion spaced apart along a longitudinal x axis, a first short side and an opposite second short side spaced apart along a widthwise y axis perpendicular to the longitudinal x axis, and a first broad side and a second broad side spaced apart along a transverse z axis perpendicular to the longitudinal x axis and the widthwise y axis. Referring to FIG. 20, the short sides of the ferrule body 112 have a dimension D1 along the z axis (in FIG. 20, the ferrule with the dimension D1 labeled is given reference number 110A for reasons explained below), and as shown in FIG. 7, the broad sides have dimension D2 along the y axis. The dimension D1 of the short side is less than the dimension D2 of the broad side. The front end portion of the ferrule body 112 defines a generally forward-facing angled ferrule contact surface 116, and the ferrule body defines at least one row of at least four longitudinal fiber passages 114 (FIG. 8) (e.g., a row of at least eight longitudinal fiber passages, or a row of at least twelve longitudinal fiber passages, a row of exactly twelve or 16 fiber passages) spaced apart along the widthwise y axis (not labeled in FIG. 8). Each of the longitudinal fiber passages 114 opens through the angled ferrule contact surface 116. Unlike the angled ferrule contact surface 16 of the prior art APC ferrule 10, the angled ferrule contact surface 116 is skewed with respect to the widthwise y axis such that the angled ferrule contact surface defines a widthwise skew angle α with respect to the widthwise y axis. Stated another way, the angled ferrule surface 116 is skew with respect to the first and second short side sides, but orthogonal to the first and second broad sides. In one or more embodiments, the widthwise skew angle α is in an inclusive range of from about 3° to about 9° (e.g., an inclusive range of from about 5° to about 8°). In the illustrated embodiment, the widthwise skew angle α is 8°. Although the z axis is not shown in the plan view of FIG. 7, in one or more embodiments the angled ferrule contact surface 116 is substantially planar and extends generally in a plane parallel to the transverse z axis. Hence the angled ferrule contact surface 116 is not skewed with respect to the transverse z axis.

The first short side and the front end portion define a first front corner region 121 of the ferrule body, and the second short side and the front end portion define a second front corner region 123 of the ferrule body. Because of the widthwise skew angle α, the first front corner region 121 is spaced apart from the second front corner region 123 in the forward direction along the longitudinal x axis. Hence, the first front corner region 121 can be referred to as a "proud corner region" and the second front corner region 123 can be referred to as a "recessed corner region."

Prior to this disclosure, to the inventors' knowledge, the industry never considered forming a multifiber ferrule to have a widthwise skew angle α. Angled contact surfaces are formed in ferrules in a grinding process (i.e., a process by which material is removed from the ferrule body to form the angle). The transverse skew angle β is used because it requires a small amount of grinding (and therefore less removed material) achieve the desired angle for back-reflection purposes. However, the inventors have recognized that removing more material to form the angled contact face 116 to have widthwise skew angle α instead of a transverse skew angle β has benefits toward making a polarity changeable multifiber connector such that removing more material in a grinding process is warranted.

Referring to FIGS. 8-22, an exemplary embodiment of multifiber optical connector in the scope of the present disclosure is generally indicated at reference number 210. The connector 210 comprises a connector housing assembly 212 having a longitudinal axis LA1, opposite first and second end wall portions (e.g., upper and lower end wall portions), and opposite first and second side wall portions. In the illustrated embodiment, the connector housing assembly 212 is a polarity-changeable MPO housing assembly of the type comprising displaceable polarity keys 220 on the first and second end wall portions thereof. The connector housing assembly 212 is configured to switch from a first polarity configuration to a second polarity configuration by moving the first polarity change key 220 on the top portion of the connector housing assembly between an extended position and a retracted position and moving a second polarity change key on the bottom portion of the connector housing between an extended position and a retracted position. More particularly, the first polarity configuration is achieved when the first polarity change key 220 is extended and the second polarity key change key is retracted. The second polarity configuration is achieved when the first polarity change key is retracted and the second polarity change key is extended. Additional details about this type of MPO polarity change housing assembly are described in further detail in U.S. Pat. Nos. 10,393,969 and 9,880,361, each of which is hereby incorporated by reference in its entirety.

Throughout these drawings, the first polarity change key 220 on the first end wall portion is always shown extended and the second polarity key on the second end wall portion is never visible because it is always retracted. The purpose of illustrating the reconfigurable connector 210 in this fixed configuration is to provide a fixed point of visual reference to help illustrate the advantages of the angled ferrule 110 with a widthwise skew angle α.

In general, multifiber optical connectors in the scope of the disclosure comprise at least one angled multifiber ferrule 110 received in the connector housing assembly 212. In the illustrated embodiment, the connector 210 comprises a first angled multifiber ferrule 110A and a second angled multifiber ferrule 110B spaced apart from the first angled multifiber ferrule such that the first broad side of the first ferrule opposes the second broad side of the second ferrule in parallel, spaced apart relationship therewith. The ferrules 110A, 110B are both identical to the ferrule 110 of FIG. 7. The characters 'A' and 'B' are used for ease of explaining how the two identical ferrules 110A, 100B are arranged in the connector 210. Although exactly two ferrules 110A, 110B are used in the illustrated embodiment, as explained in further detail below, certain connectors in the scope of this disclosure may include exactly one angled multifiber ferrule 110. In addition, other numbers of ferrules are possible without departing from the scope of the disclosure. For example, it will become apparent that any even number of angled multifiber ferrules 110 can be located in the same polarity-changeable connector housing using the principles of the present disclosure. In addition, it is possible to use an even number of angled multifiber ferrules 110 with one or more non-angled ferrules in the same connector housing assembly (e.g., by locating the one or more non-angled ferrules symmetrically between the broad sides of the angled ferrules).

Figure 19:
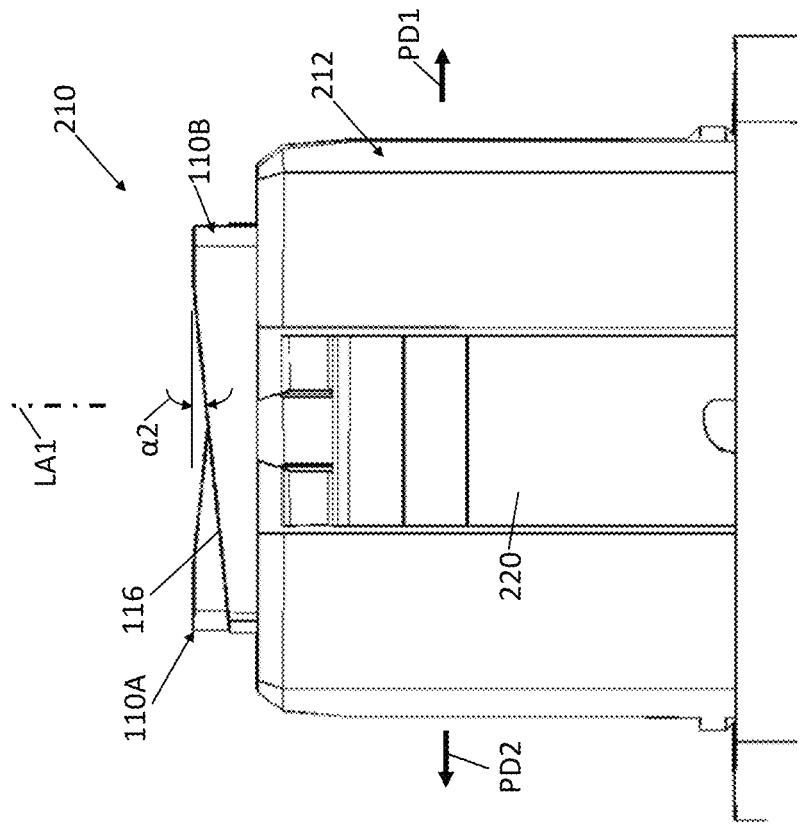
FIG. 19 is an enlarged view of a portion of FIG. 12.
Figure 18:
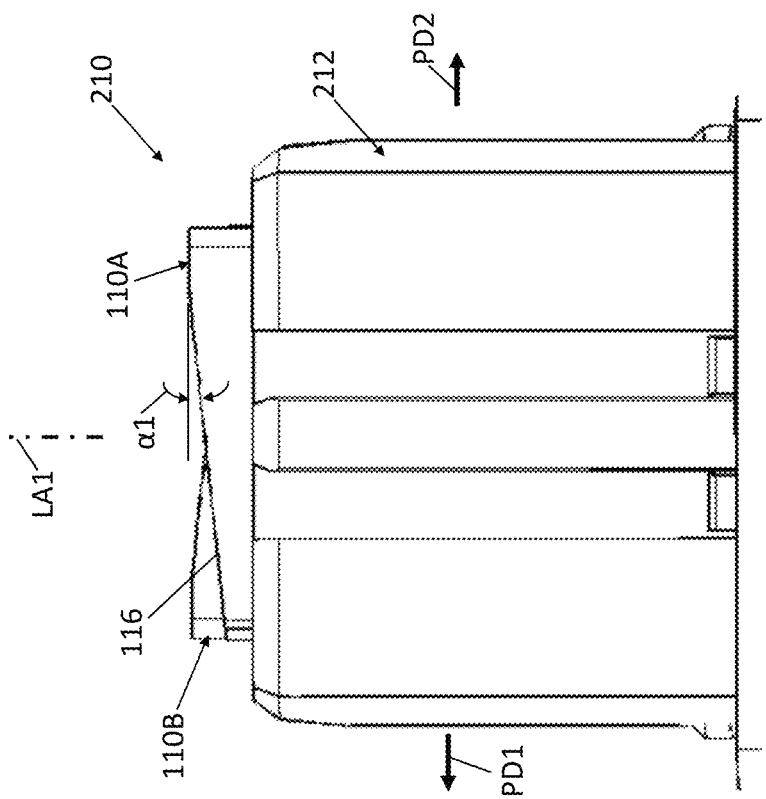
FIG. 18 is an enlarged view of a portion of FIG. 11.

Referring to FIGS. 18-19, the first and second angled multifiber ferrules 110A, 110B have opposing widthwise skew angles α1, α2 such that the angled ferrule contact surface 116 of the first angled multifiber ferrule 110A faces predominantly forward along the longitudinal axis LA1 and slightly toward a first direction PD1 perpendicular to the longitudinal axis and the angled ferrule contact surface of the second angled multifiber ferrule 110B faces predominantly forward along the longitudinal axis and slightly toward an opposite second direction PD2 perpendicular to the longitudinal axis. Suitably, the opposing widthwise skew angles α1, α2 are equal in magnitude (e.g., the angles α1, α2 are both equal to about 8°).

Figure 21:
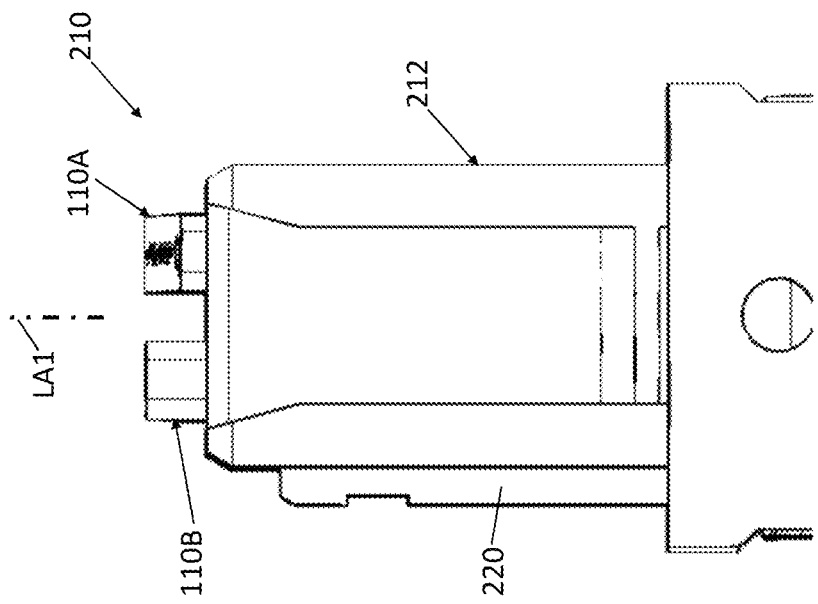
FIG. 21 is an enlarged view of a portion of FIG. 9.

Because the connector 210 employs first and second angled multifiber ferrules 110A, 110B that have widthwise skew angles α1, α2 that are equal in magnitude and opposite in direction, the angled contact surfaces 16 have symmetry about the longitudinal axis that enables the connector housing assembly 212 to be selectively reconfigured with respect to the first and second angled multifiber ferrules between a first polarity configuration and a second polarity configuration. Comparing FIGS. 9 and 10, 11 and 12, 13 and 14, and 15 and 16 shows the symmetry of the angled contact surfaces 116 of the ferrules 110A, 110B about the longitudinal axis LA1 of the connector 210. FIG. 9 is an elevation looking toward the short sides of the ferrules 110A, 110B in one direction, and FIG. 10 is an opposite elevation (note how the polarity key 220 switches from the left side of the drawing in FIG. 9 to the right side of the drawing in FIG. 10). But in Both FIGS. 9 and 10, the ferrule interface has the exact same appearance despite the inverted orientation about the longitudinal axis LA1. (FIG. 20 is an enlarged view of FIG. 10 and FIG. 21 is an enlarged view of FIG. 9, and therefore FIGS. 20 and 21 likewise show how the ferrule interface has the same appearance in elevation from the two opposite short sides of the connector 210). For example, the proud front corner regions 121 of both ferrules 110A, 110B have the same corner location CL1 along the longitudinal axis LA1, and the recessed front corner regions 123 of both ferrules 110A, 110B have the same corner location CL2 that is offset from the corner location CL1 along the longitudinal axis LA1.

FIG. 11 is an elevation looking at the connector housing assembly 212 toward the side of the connector housing on which the polarity key is retracted, and FIG. 12 is an opposite elevation (note how FIG. 11 shows the broad side with the retracted polarity key whereas FIG. 12 shows the broad side with the extended polarity key 220). But in Both FIGS. 11 and 12, the ferrule interface has the exact same appearance despite the inverted orientation about the x axis. (FIG. 18 is an enlarged view of FIG. 11 and FIG. 19 is an enlarged view of FIG. 12, and therefore FIGS. 18 and 19 likewise show how the ferrule interface has the same appearance in elevations taken from the two opposite broad sides of the connector 210).

Figure 13:
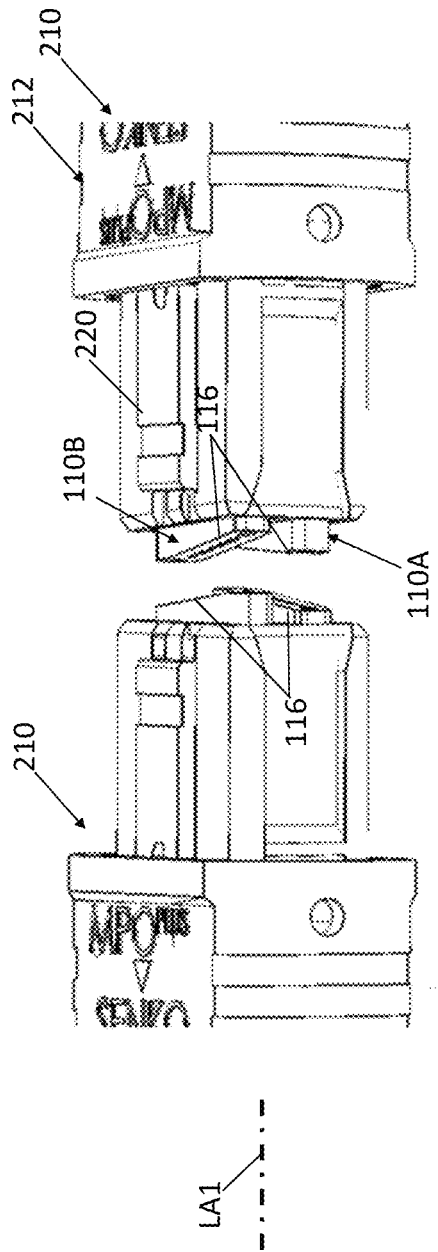
FIG. 13 is another perspective of the multifiber connectors of FIG. 8.
Figure 14:
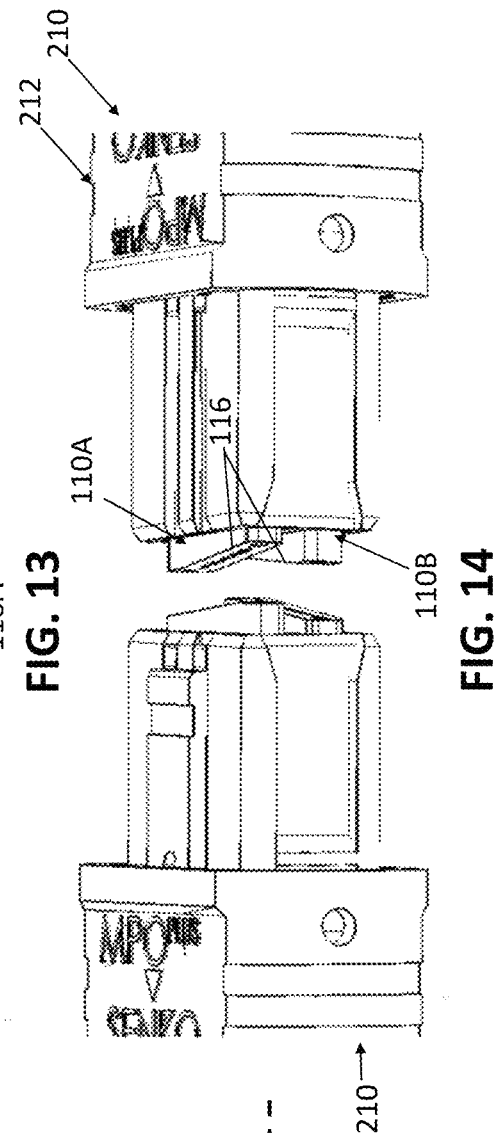
FIG. 14 is another perspective similar to FIG. 13 but with one of the connectors in an inverted orientation.
Figure 17:
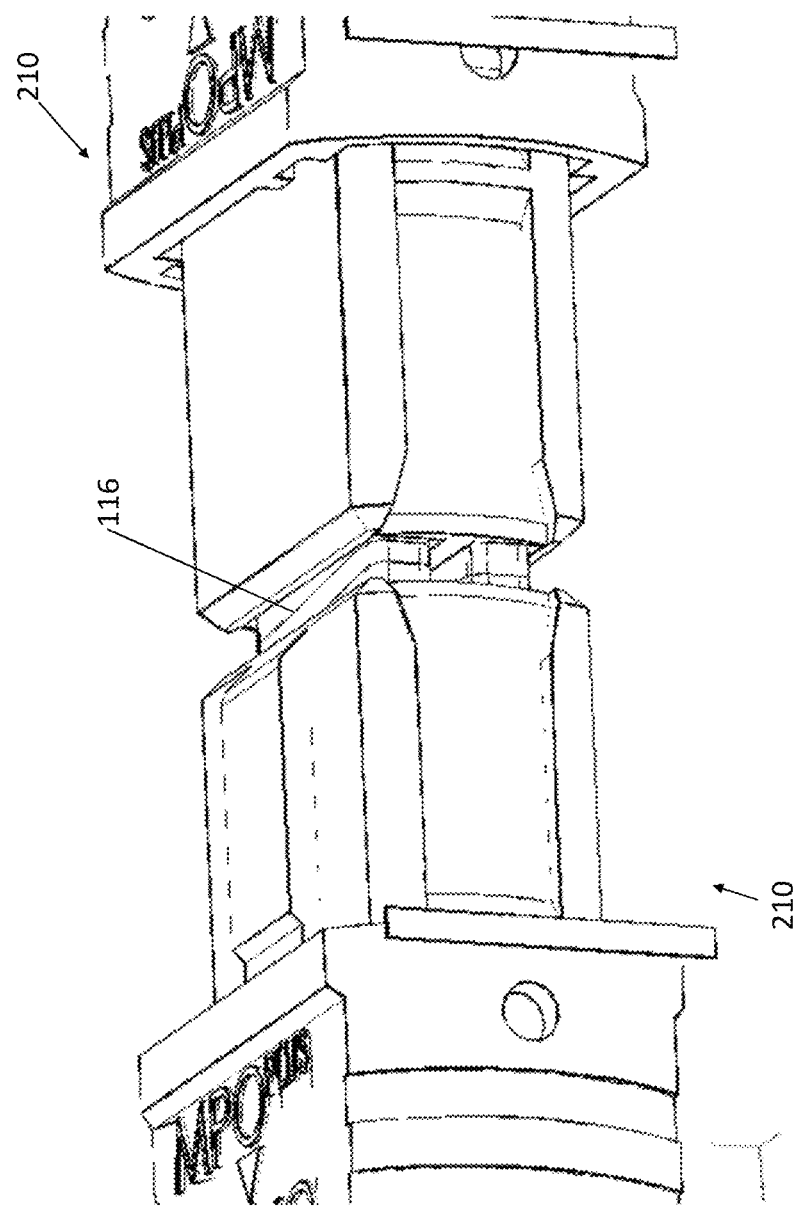
FIG. 17 is another perspective of the multifiber connectors of FIG. 8.

FIGS. 13 and 15 show a connector 210 on the right side of the drawing approaching an identical connector while the connector on the right side is oriented so that the extended polarity key 220 faces up. By contrast, in FIGS. 14 and 16, the connector 210 on the right has been inverted so that the broad side on which the polarity key has been retracted faces up. In both orientations, the ferrule interface on the connector looks the same. Hence, in both orientations of the connector on the right 210, a connection can be made to the connector on the left as shown in FIG. 17.

Accordingly, it can be seen that the angled multifiber ferrule 110 enables polarity change systems to be used with connectors fitted with multifiber APC ferrules. In the illustrated embodiment, the polarity change is accomplished by moving a first polarity change key 220 on the top portion of the connector housing assembly between an extended position and a retracted position and moving a second polarity change key on the bottom portion of the connector housing between an extended position and a retracted position. But other types of polarity change systems are also within the scope of this disclosure. Generally speaking, for exemplary embodiments of polarity changeable connectors in the scope of this disclosure, when the connector housing assembly 212 is in the first polarity configuration: the connector 210 is configured to mate with a mating interface (not shown) in a first ferrule orientation relative to the mating interface in which the first angled multifiber ferrule 110A is aligned with a first ferrule position of the mating interface and the second angled multifiber ferrule 110B is aligned with a second ferrule position of the mating interface; and the connector housing assembly 212 is configured to interfere with the multifiber optical connector 210 mating with the mating interface (not shown) in a second ferrule orientation relative to the mating interface in which the second angled multifiber ferrule 110B is aligned with the first ferrule position and the first angled multifiber ferrule 110A is aligned with the second ferrule position. By contrast, when the connector housing assembly 212 is in the second polarity configuration: the multifiber optical fiber connector 210 is configured to mate with the mating interface in the second ferrule orientation and the connector housing is configured to interfere with the multifiber optical connector mating with the mating interface in first ferrule orientation.

Figure 22:
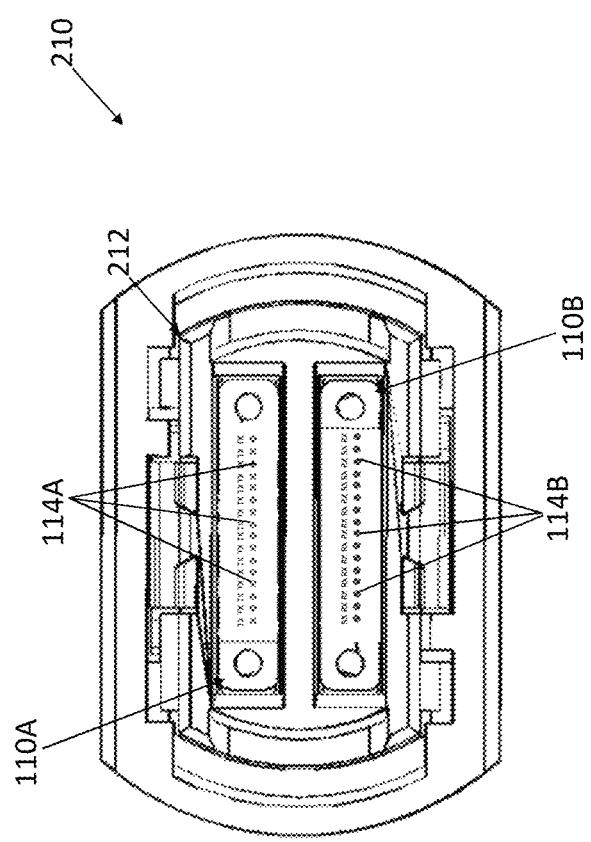
FIG. 22 is a front elevation of the connector of FIG. 9.

Various uses for the polarity changeable connector are possible without departing from the scope of the disclosure. Referring to FIG. 22, in an exemplary application, all of the fiber passages 114A of the first ferrule 110A are used to terminate transmit fibers and all of the fiber passages 114B of the second ferrule 110B are used to terminate receive fibers. Those skilled in the art will recognize that a polarity change system has advantages for this type of application.

Referring to FIGS. 23-35, another exemplary embodiment of a multifiber connector in the scope of this disclosure is generally indicated at reference number 310. The connector 310 is similar to the connector 210 except that a different polarity changeable connector housing assembly 312 is provided. Instead of the connector utilizing an MPO-style connector housing, the connector 310 utilizes a connector housing assembly 312 in the style of a polarity changeable SN connector. The SN connector has a longitudinal axis LA2 and the connector housing assembly 312 comprises opposite first and second (e.g., upper/lower) end wall portions and opposite first and second side wall portions generally perpendicular to the end wall portions. The connector housing assembly 312 comprises an outer housing 314 (broadly, a polarity-specific component) comprising a first polarity key 320 of a first size on one end wall portion of the connector housing assembly and a second polarity key 322 of a second size on the opposite end wall portion of the connector housing assembly. The outer housing 314 functions as a polarity-specific component of the connector housing assembly 312 that can be disconnected from a remainder of the multifiber optical connector, rotated 180° about the longitudinal axis LA2 in relation to the remainder of the multifiber optical connector, and reinstalled to change the polarity of the connector between the first and second polarity configurations. Additional details of this type of polarity change system are described in U.S. Pat. Nos. 10,705,300 and 10,191,230, each of which is hereby incorporated by reference in its entirety. It will be appreciated in view of these disclosures that other types of connector housing assemblies employing this general type of polarity change system can also be used with the angled multifiber ferrule systems of this disclosure.

Like the connector 210 above, the connector 310 comprises a first angled multifiber ferrule 110A and a second angled multifiber ferrule 110B spaced apart so that two broad sides of the ferrules oppose one another in a parallel, spaced apart relationship. The first and second angled multifiber ferrules have opposing widthwise skew angles α1, α2 such that the angled contact surface 116 of the first ferrule 110A faces predominantly forward along the longitudinal axis LA2 and slightly toward a first direction PD1 perpendicular to the longitudinal axis and the angled ferrule contact surface of the second angled multifiber ferrule 110B faces predominantly forward along the longitudinal axis and slightly toward an opposite second direction D4 perpendicular to the longitudinal axis. Suitably, the opposing widthwise skew angles α1, α2 are equal in magnitude (e.g., the angles α1, α2 are both equal to about 8°).

Because the connector 210 employs first and second angled multifiber ferrules 110A, 110B that have widthwise skew angles α1, α2 that are equal in magnitude and opposite in direction, the angled contact surfaces 116 again have symmetry about the longitudinal axis LA2 that enables the connector housing assembly 212 to be selectively reconfigured with respect to the first and second angled multifiber ferrules between a first polarity configuration and a second polarity configuration. FIG. 23 is an orthogonal view looking toward the key 322, and FIG. 10 is an opposite orthogonal view looking toward the opposite key 320. But in both FIGS. 23 and 24, the ferrule interface has the exact same appearance despite the inverted orientation about the longitudinal axis LA2. For example, the proud front corner regions 121 of both ferrules 110A, 11B have the same corner location CL3 along the longitudinal axis LA2, and the recessed front corner regions 123 of both ferrules 110A, 110B have the same corner location CL4 that is offset from the corner location CL3 along the longitudinal axis LA2.

FIG. 25 is a side elevation showing key 320 at right and key 322 at left, whereas FIG. 26 is an opposite side elevation with the keys on opposite sides. But in both FIGS. 25 and 26, the ferrule interface has the exact same appearance despite the inverted orientation about the longitudinal axis LA2. Accordingly, it can be seen that the angled multifiber ferrules 110A, 110B enable the connector 310 to have a polarity change system.

Figure 27:
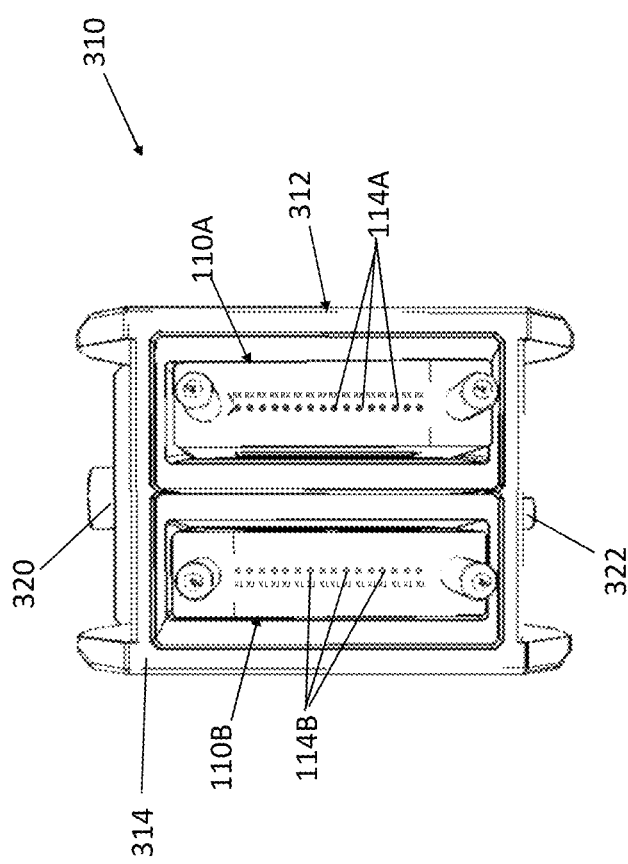
FIG. 27 is a front elevation of the multifiber connector of FIG. 23.
Figure 39:
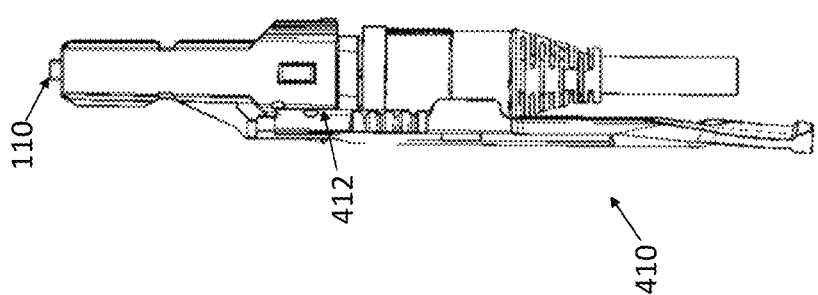
FIG. 39 is an elevation of the multifiber connector of FIG. 36 from the opposite vantage of FIG. 36.
Figure 38:
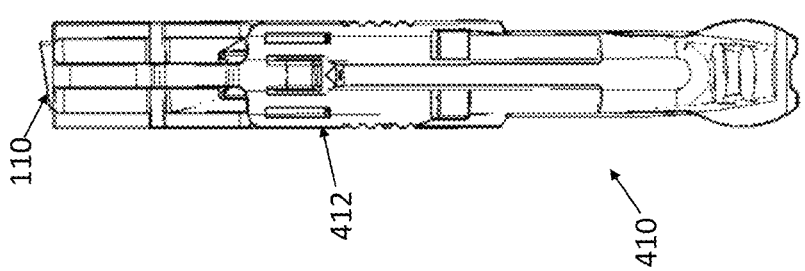
FIG. 38 is a plan view of the multifiber connector of FIG. 36 from the opposite vantage of FIG. 37.
Figure 37:
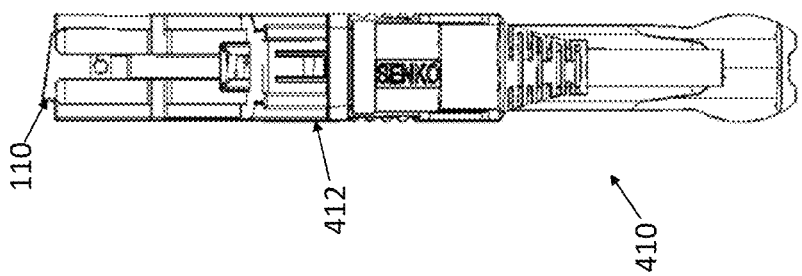
FIG. 37 is a plan view of the multifiber connector of FIG. 36.
Figure 36:
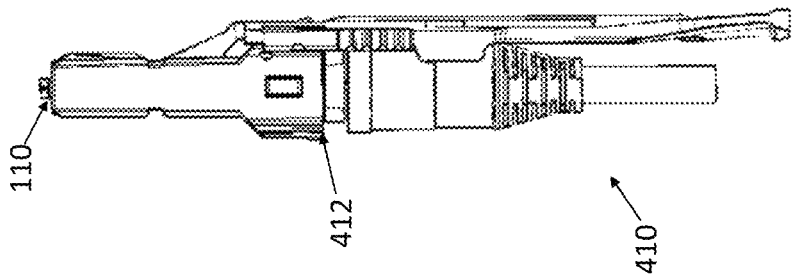
FIG. 36 is an elevation of another embodiment of a multifiber connector according to this disclosure showing the connector in a female configuration.
Figure 40:
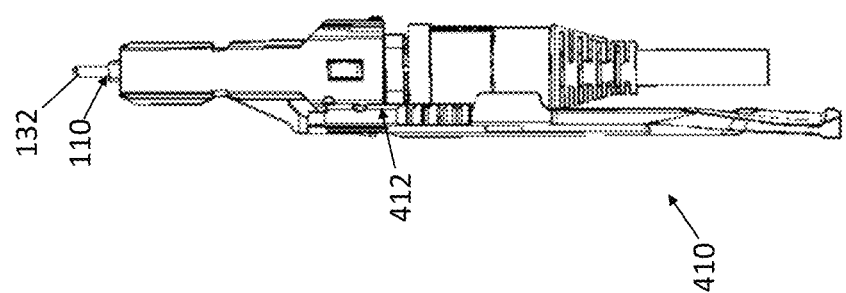
FIG. 40 is an elevation of embodiment of the multifiber connector of FIG. 36 in a male configuration.
Figure 41:
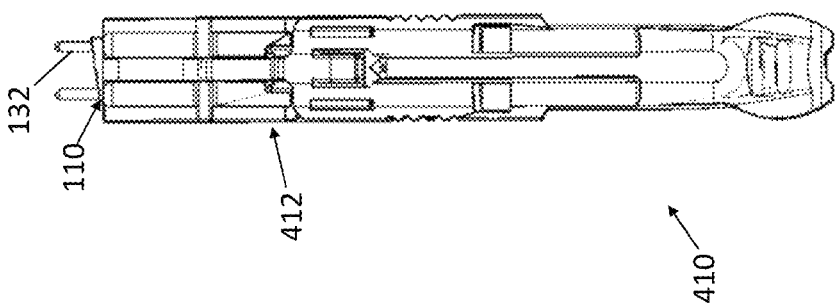
FIG. 41 is a plan view of the multifiber connector of FIG. 40.
Figure 42:
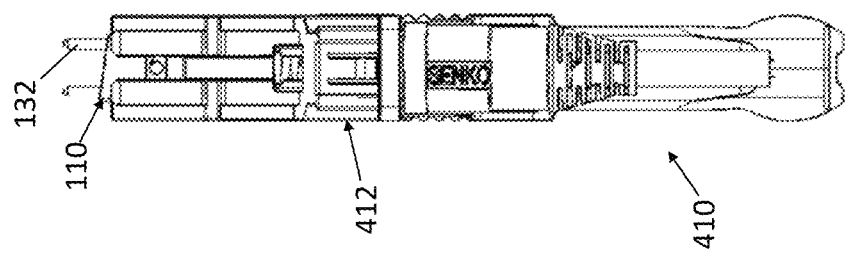
FIG. 42 is a plan view of the multifiber connector of FIG. 40 from the opposite vantage of FIG. 41.
Figure 43:
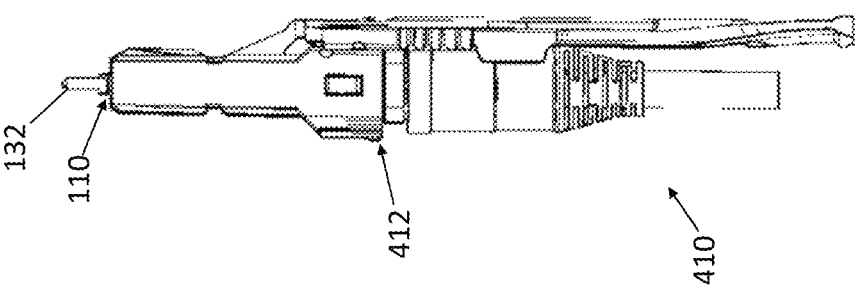
FIG. 43 is an elevation of the multifiber connector of FIG. 40 from the opposite vantage of FIG. 40.

Referring to FIG. 27, in an exemplary application, all of the fiber passages 114B of the second ferrule 110B are used to terminate transmit fibers and all of the fiber passages 114A of the first ferrule 110A are used to terminate receive fibers.

Referring to FIGS. 28-31, multifiber ferrules typically comprise ferrule-to-ferrule alignment elements for directly aligning the ferrule to another ferrule for making a low-loss optical connection. In the illustrated embodiment, each of the ferrules 110A, 110B comprises a pair of alignment pin sockets 130 on opposite sides of the fiber passages 114. The alignment pin sockets 130 of the connectors on the left side of the drawing are open and the alignment pin sockets 130 of the connector 310 on the right side of the drawings have alignment pins 132 therein protruding longitudinally forward. During use, these alignment pins 132 mate with the open alignment pin sockets 130 of the mating connector 310 to ensure proper alignment of the ferrules 110A, 110B. It can be seen by comparing FIGS. 28 and 30 with 29 and 31 that this configuration of alignment pin sockets and alignment pins still allows for polarity change (note that polarity key 320 is on top of the right connector 310 in FIGS. 28 and 30 and polarity key 322 is on top of the right connector in FIGS. 29 and 31). One connector 310 (left connector in the drawing) functions for ferrule-to-ferrule alignment purposes as an all-female connector and the other connector (right connector in the drawing) functions as an all-male connector.

An alternative ferrule-to-ferrule alignment configuration is shown in FIGS. 32-35. Here, both connectors 310 comprise an open alignment socket 130 in one of the corner regions 121, 123 and an alignment pin 132 in the other corner region 121, 123. In the illustrated embodiment, the alignment pin 132 is located in the proud corner region 121, but it could instead be placed in the recessed corner region 123 in other embodiments. Again, it can be seen by comparing FIGS. 32 and 34 with FIGS. 33 and 35 that this configuration of alignment pin sockets and alignment pins still allows for polarity change (note that polarity key 320 is on top of the right connector 310 in FIGS. 32 and 34 and polarity key 322 is on top of the right connector in FIGS. 33 and 35). Both connectors 310 are hermaphroditic for ferrule-to-ferrule alignment purposes.

Figure 44:
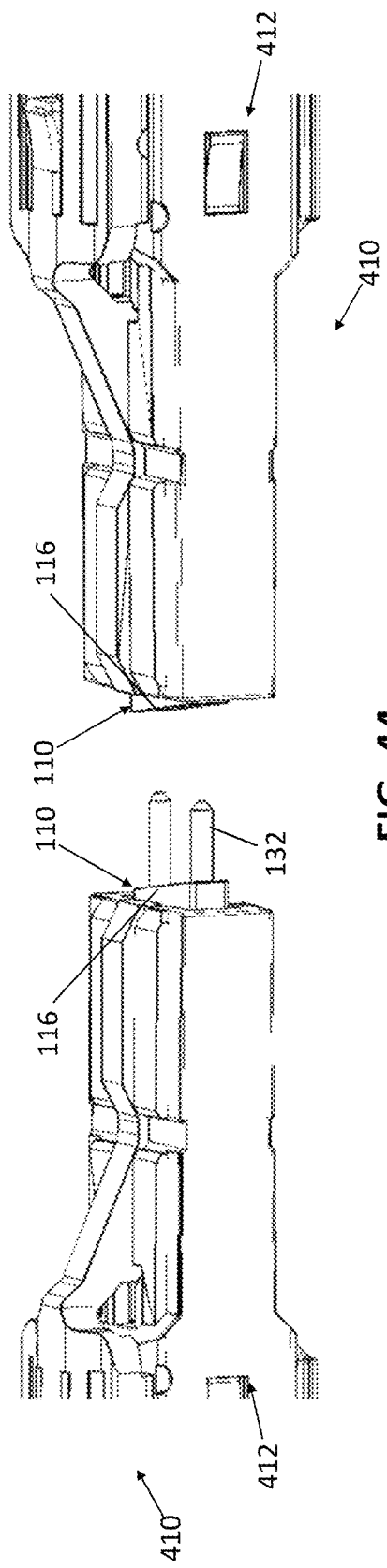
FIG. 44 is an enlarged fragmentary perspective of the connectors of FIGS. 36 and 40 approaching one another.
Figure 45:
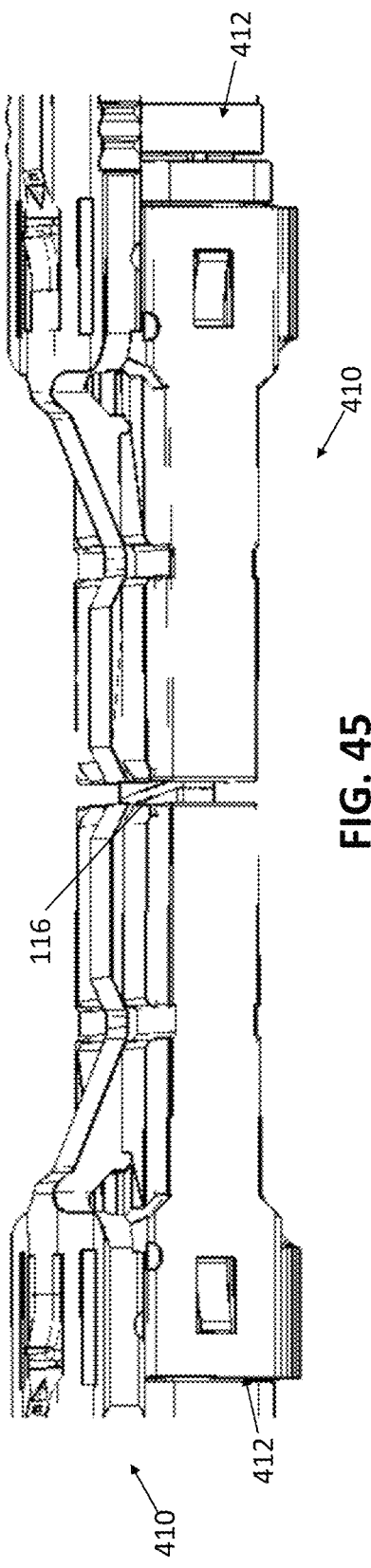
FIG. 45 is an enlarged fragmentary perspective of the connectors of FIGS. 36 and 40 mated to one another.
Figure 47:
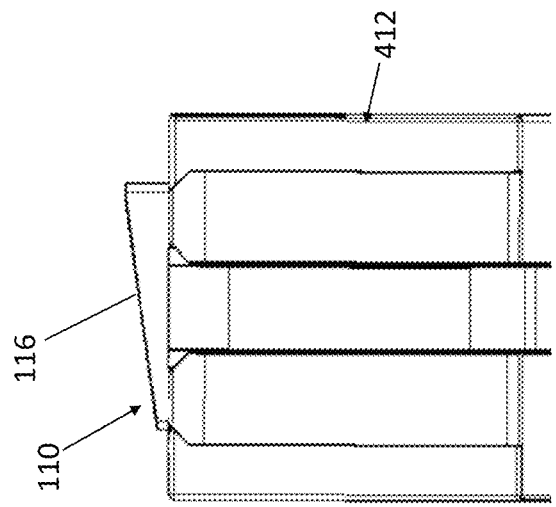
FIG. 47 is an enlarged view of a portion of FIG. 38.
Figure 46:
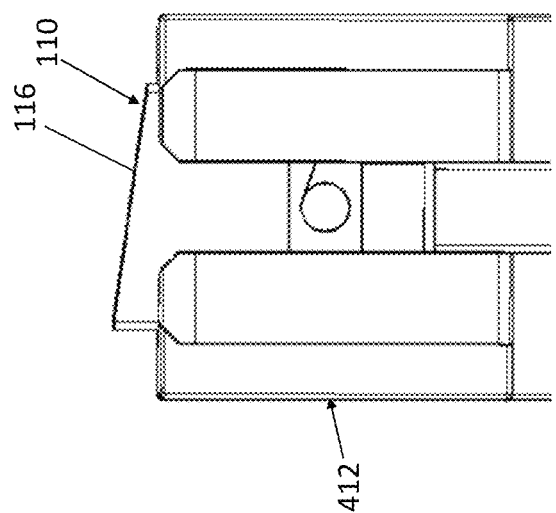
FIG. 46 is an enlarged view of a portion of FIG. 37.
Figure 49:
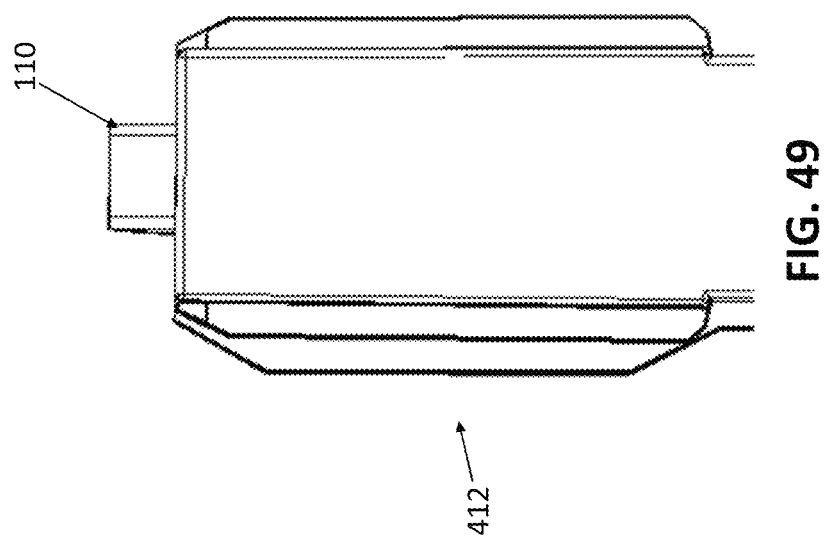
FIG. 49 is an enlarged view of a portion of FIG. 39.
Figure 48:
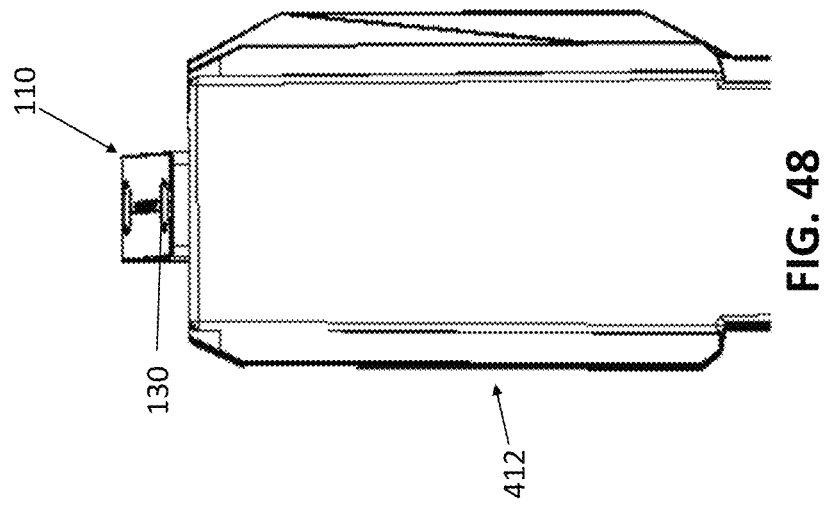
FIG. 48 is an enlarged view of a portion of FIG. 36.

Referring to FIGS. 36-49, another exemplary embodiment of a multifiber connector in the scope of this disclosure is generally indicated at reference number 410. The connector 410 uses exactly one multifiber ferrule 110 in a CS connector housing assembly 412. Additional details about the CS connector housing assembly can be found in U.S Pat. Nos. 10,228,521, 10,185,100, 10,359,583, and 10,725,248, each of which is hereby incorporated by reference in its entirety for all purposes. As shown in FIGS. 36-39, the connector 410 can be configured as a female connector. As shown in FIGS. 40-43, the connector 410 can also be configured as a male connector for mating with a female connector (see FIGS. 44-45) by placing alignment pins 132 in the pin sockets 130 of the ferrule 110. It is also contemplated that the connector 410 could be configured to have hermaphroditic ferrule-to-ferrule alignment features by placing a pin 132 in one pin socket while leaving the other pin socket 130 open. As can be seen in FIGS. 44-45 the connector 410 can facilitate a good multifiber physical contact connection with low insertion loss.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A multifiber optical connector comprising:
a connector housing assembly having a longitudinal axis, opposite first and second end wall portions, and opposite first and second side wall portions; and
at least one angled multifiber ferrule received in the connector housing assembly, each angled multifiber ferrule comprising a ferrule body having a front end portion and a rear end portion spaced apart along the longitudinal axis, a first short side and an opposite second short side spaced apart along a widthwise axis of the ferrule perpendicular to the longitudinal axis, and a first broad side and a second broad side spaced apart along a transverse axis of the ferrule perpendicular to the longitudinal axis and the widthwise axis, the front end portion of the ferrule body defining a generally forward-facing angled ferrule contact surface, the ferrule body defining at least one row of at least four longitudinal fiber passages spaced apart along the widthwise axis, each of the longitudinal fiber passages opening through the angled ferrule contact surface, wherein the angled ferrule contact surface is skewed with respect to the widthwise axis such that the angled ferrule contact surface defines a widthwise skew angle with respect to the widthwise axis,
wherein the at least one angled multifiber ferrule comprises a first angled multifiber ferrule and a second angled multifiber ferrule spaced apart from the first angled multifiber ferrule such that the first broad side of the first angled multifiber ferrule opposes the second broad side of the second angled multifiber ferrule in parallel, spaced apart relationship therewith,
wherein the first and second angled multifiber ferrules have opposite widthwise skew angles such that the angled ferrule contact surface of the first angled multifiber ferrule faces predominantly forward along the longitudinal axis and slightly toward a first direction perpendicular to the longitudinal axis and the angled ferrule contact surface of the second angled multifiber ferrule faces predominantly forward along the longitudinal axis and slightly toward an opposite second direction perpendicular to the longitudinal axis.

2. The multifiber optical connector as set forth in claim 1, wherein the widthwise skew angle is in an inclusive range of from about 3° to about 9°.

3. The multifiber optical connector as set forth in claim 1, wherein the widthwise skew angle is in an inclusive range of from about 5° to about 8°.

4. The multifiber optical connector as set forth in claim 1, wherein the angled ferrule contact surface of the first or second angled multifiber ferrules extends in a plane parallel to the transverse axis.

5. The multifiber optical connector as set forth in claim 1, wherein the opposite widthwise skew angles are equal in magnitude.

6. The multifiber optical connector as set forth in claim 5, wherein the connector housing assembly is selectively reconfigurable with respect to the first and second angled multifiber ferrules between a first polarity configuration and a second polarity configuration,
wherein when the connector housing assembly is in the first polarity configuration:
the multifiber optical fiber connector is configured to mate with a mating interface in a first ferrule orientation relative to the mating interface in which the first angled multifiber ferrule is aligned with a first ferrule position of the mating interface and the second angled multifiber ferrule is aligned with a second ferrule position of the mating interface and
the connector housing is configured to interfere with the multifiber optical connector mating with the mating interface in a second ferrule orientation relative to the mating interface in which the second angled multifiber ferrule is aligned with the first ferrule position and the first angled multifiber ferrule is aligned with the second ferrule position; and
wherein when the connector housing assembly is in the second polarity configuration:
the multifiber optical fiber connector is configured to mate with a mating interface in the second ferrule orientation and
the connector housing is configured to interfere with the multifiber optical connector mating with the mating interface in first ferrule orientation.

7. The multifiber optical connector as set forth in claim 6, wherein connector housing assembly is configured to adjust between the first polarity configuration and the second polarity configuration by one of:
moving a first polarity change key on the first end wall portion of the connector housing assembly between an extended position and a retracted position and moving a second polarity change key on the second end wall portion of the connector housing between an extended position and a retracted position; and
removing a polarity-specific component from a remainder of the multifiber optical connector, rotating the polarity-specific housing component 180° about the longitudinal axis in relation to the remainder of the multi-fiber optical connector, and reinstalling the polarity-specific component.

8. The multifiber optical connector as set forth in claim 1, wherein the first angled multifiber ferrule comprises a first alignment pin and a first open pin socket and wherein the second multifiber ferrule comprises a second alignment pin and a second open pin socket, the first alignment pin being spaced apart from the first open pin socket in a one of the first and second directions and the second alignment pin being spaced apart from the second open pin socket in the other of the first and second directions.

9. The multifiber optical connector as set forth in claim 1, wherein the first angled multifiber ferrule has a first front ferrule corner and a second front ferrule corner spaced apart from the first front corner in the first direction and wherein the second angled multifiber ferrule has a third front ferrule corner and a fourth front ferrule corner spaced apart from the third front ferrule corner in the first direction, the first front ferrule corner and the fourth front ferrule corner having a first longitudinal corner location along the longitudinal axis and the second front ferrule corner and the third front ferrule corner having a second longitudinal corner location along the longitudinal axis offset from the first longitudinal corner location along the longitudinal axis.

\* \* \* \* \*